United States Patent
Ozaki et al.

[19]

[11] Patent Number: 6,091,028
[45] Date of Patent: Jul. 18, 2000

[54] POWDER/CHIP WEIGHING METHOD

[75] Inventors: Masahide Ozaki; Shinichi Kojima, both of Toyama-ken, Japan

[73] Assignee: YKK Corporation, Tokyo, Japan

[21] Appl. No.: 09/176,753

[22] Filed: Oct. 22, 1998

[30] Foreign Application Priority Data

Oct. 27, 1997 [JP] Japan .................................. 9-332275

[51] Int. Cl.[7] .......................... G01G 13/04; G01G 9/00; G01G 13/00; B65B 1/30; B67C 3/26
[52] U.S. Cl. ........................ 177/1; 177/116; 177/121; 141/83; 141/284; 222/1; 222/77
[58] Field of Search ................... 141/83, 284; 222/56, 222/77, 1; 177/1, 60, 105, 108, 116, 121

[56] References Cited

U.S. PATENT DOCUMENTS

| | | | |
|---|---|---|---|
| 3,654,970 | 4/1972 | Teboul ................................. | 141/284 |
| 3,782,528 | 1/1974 | Burger et al. ......................... | 141/284 |
| 4,531,597 | 7/1985 | Focke et al. ........................... | 222/77 |
| 4,867,258 | 9/1989 | Narukawa et al. ..................... | 177/116 |
| 5,022,444 | 6/1991 | Kendall et al. ........................ | 222/77 |

FOREIGN PATENT DOCUMENTS

| | | |
|---|---|---|
| 2 184 915 | 12/1973 | France . |
| 2 206 498 | 6/1974 | France . |
| 88 01 400 | 4/1988 | Germany . |
| WO 90/11496 | 10/1990 | WIPO . |

Primary Examiner—Randy W. Gibson
Attorney, Agent, or Firm—Hill & Simpson

[57] ABSTRACT

This invention provides a method of weighing powder/chip, in which the powder/chip can be fed from the conduit into the weighing vessel accurately and efficiently without being affected by the state of the conduit, that of the weighing vessel and that of ambient air. With the method, the powder/chip is weighed by means of the conduit arranged below a storage section and adapted to be tilted around a pivot according to a command sent from a weighing section to let the powder/chip fall through a discharge port at an end of the conduit into a weighing vessel placed on the weighing section. The conduit is tilted sequentially at least by three different feeding angles from large, small to minute to let the powder/chip fall by a large volume, a small volume and a minute volume respectively.

3 Claims, 4 Drawing Sheets

POWDER/CHIP WEIGHING METHOD

BACKGROUND OF THE INVENTION

1. Field of the Invention

This invention relates to a method of weighing powder/chip and, more particularly, it relates to a method of feeding powder/chip to a weighing vessel efficiently and accurately.

2. Prior Art

As disclosed in Japanese Patent Laid-Open Publication No. 55-22178, a method is known in which cereal grains are weighed using a vertically shiftable conduit provided with an open end and arranged above a weighing vessel. The cereal grains fed in through the other end are mostly made to fall by gravity into the weighing vessel by tilting the conduit with the open end facing downward and then the conduit is turned to become horizontal and vibrated to let the residual grains spin out and fall into the vessel so that the grain may be weighed in an efficient way.

With the above described known weighing method, the conduit is tilted with the open end facing downward to dump a large volume of grains from the conduit at a time. However, the volume of grains discharged from the conduit by a single dumping motion varies depending on the state of the conduit and that of the object to be dumped and this variation in the dumped volume inevitably affects the subsequent vibration step of discharging the residual grains to give rise to fluctuations in the weighing accuracy and the weighing speed. Additionally, the step of discharging the residual grains by vibration is apt to be affected by external factors including ambient temperature and humidity to make the fluctuations in the weighing accuracy and the weighing speed even more remarkable, causing problems in efficiency and accuracy.

In view of the above identified problems of the prior art, it is therefore the object of the present invention to provide a method of weighing powder/chip that can feed the powder/chip from the conduit into the weighing vessel accurately and efficiently without being affected by the state of the conduit, that of the weighing vessel and that of the ambient air.

SUMMARY OF THE INVENTION

According to the invention, the above object is achieved by providing a method of weighing powder/chip by means of a conduit arranged below a storage section and adapted to be tilted around a pivot according to a command sent from a weighing section to let the powder/chip fall through a discharge port at an end of the conduit into a weighing vessel placed on the weighing section, the conduit being tilted sequentially at least by three different feeding angles from large angle, small angle to minute angle to let the powder/chip fall by a large volume, a small volume and a minute volume respectively.

Preferably, the feeding angle of the conduit is set each time to let the powder/chip fall into the weighing vessel after turning the conduit back to the state where the discharge port is facing slightly upwardly of the horizontal state. With such arrangement, the power/chip can be fallen to be fed more efficiently with higher weighing precision.

It is preferable that the feeding angle of the conduit at the final stage is between 1 and 2 degrees from the level position and the discharge port at an end of the conduit is pivoted back and forth between the feeding angle and the level position to let the powder/chip fall into the weighing vessel, so that the weighing precision further improves.

DETAILED DESCRIPTION OF THE PREFERRED EMBODIMENTS

Now, an embodiment of the invention will be described by referring to the accompanying drawings.

The method of weighing powder/chip according to the invention can be used for weighing various different powdery and chip-like objects. The accompanying drawings show a weighing apparatus to be used with the method of weighing powder/chip according to the invention and adapted to weigh blank chips to be used for molding plastic fasteners.

Figure 1:
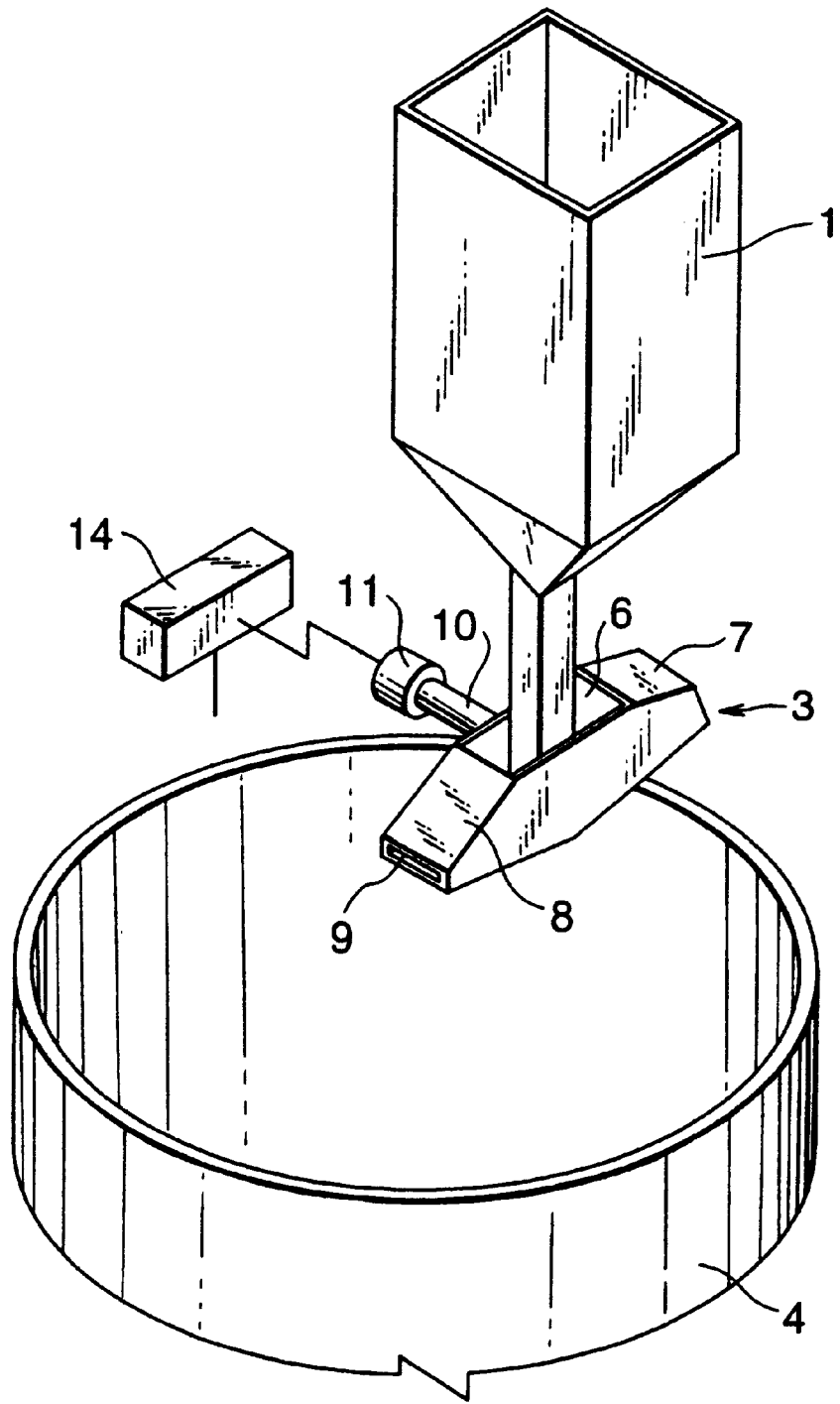
FIG. 1 is a schematic perspective view of a powder/chip weighing apparatus using the weighing method according to the invention.
Figure 2:
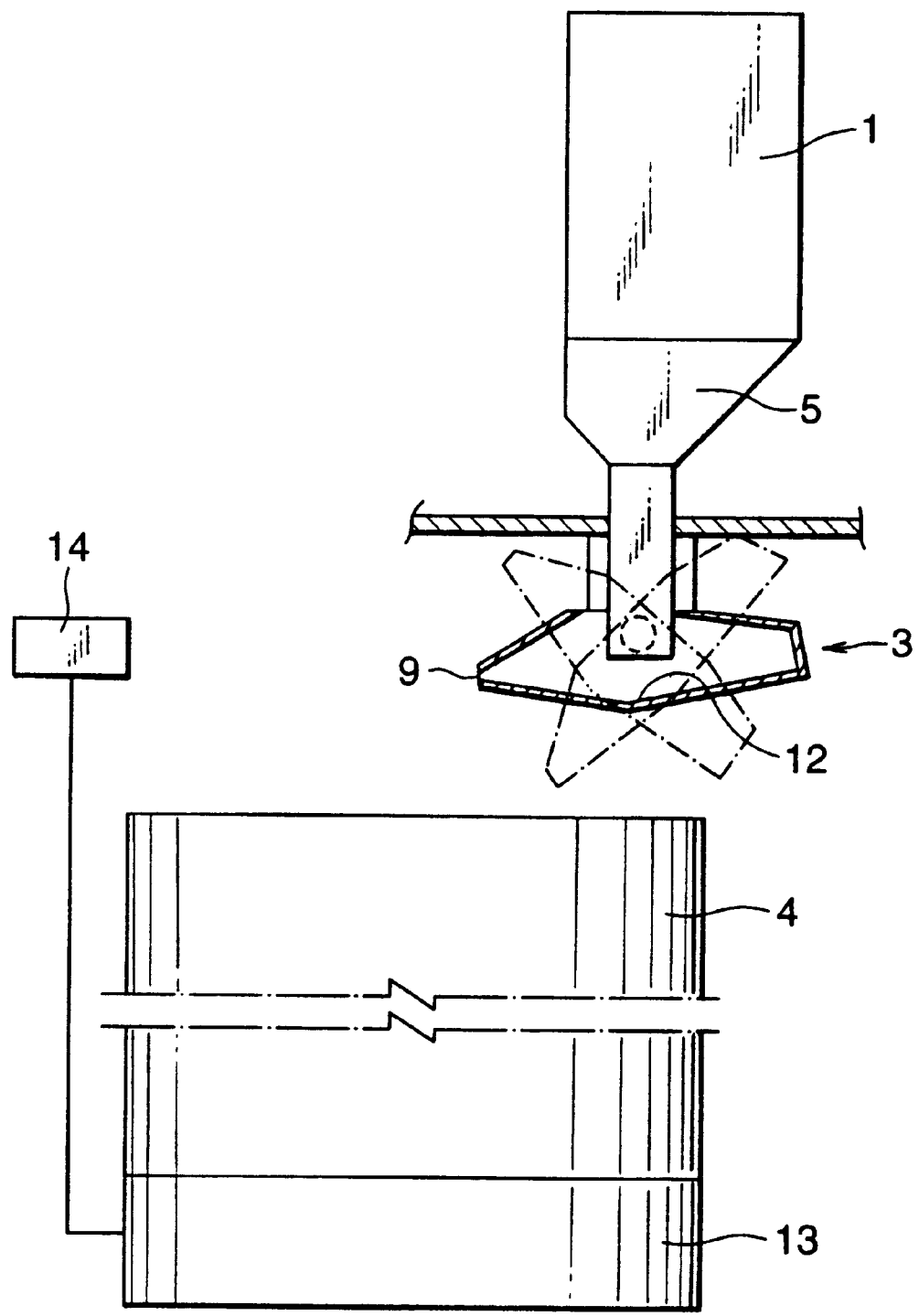
FIG. 2 is a schematic side view of the powder/chip weighing apparatus of FIG. 1.

FIGS. 1 and 2 show the entire weighing apparatus in which a storage section 1 such as a hopper or a cyclone is arranged at an upper position and contains chips 2 (shown in FIGS. 3 to 7) which are fed via a conduit 3 to a weighing vessel 4 arranged at a lower position for weighing.

The storage section 1 typically comprises a hopper or a cyclone of an ordinary type having a funnel-shaped bottom portion 5 whose front end is inserted into central opening 6 of the conduit 3 for feeding powder/chip by a predetermined volume.

As shown in FIG. 1, the conduit 3 has a box-like profile and the central opening 6 at the top. The opposite ends 7, 8 of the conduit 3 are tapered from above and below and one end 7 of the conduit 3 is closed while a discharge port 9 is formed at the opposite end 8 so that chips 2 fall through the discharge port 9 as the conduit 3 is tilted. As seen from FIG. 1, the conduit 3 is supported by a shaft 10 at the center of a lateral side thereof so that the conduit 3 is tilted in a manner as indicated by broken lines in FIG. 2 as the shaft 10 is driven to rotate by a motor 11 connected to the opposite end of the shaft 10. The powder/chip contained in the conduit 3 is caused to fall into the weighing vessel 4 as the conduit 3 is tilted to make the discharge port 9 face downward. The tilt angle of the conduit 3 can be controlled finely to improve the weighing accuracy by using a stepping motor, a servo motor or the like provided with fine angular control means which enables fine angular indexing for the motor 11. The conduit 3 may provided with a bracket at the center of the lateral side so that it may be supported by the shaft 10 by way of the bracket. Additionally, the conduit 3 may be provided with an angle of repose 12 at the center of the bottom thereof to ensure that chips 2 would not fall through the discharge port 9 so long as the conduit 3 is held to a horizontal state.

The weighing vessel 4 is located below the storage section 1 and the conduit 3 to receive chips 2 discharged from the conduit 3. It is carried by a weighing section 13, which may be a scale, a spring balance or an electric scale. The weighing section 13 measures the weight of the chips 2 fed into the weighing vessel 4 for each of at least three stages and the data obtained by the measurement is fed to central processing unit (CPU) 14, which issues a command to the motor 11 for tilting the conduit 3 according to a computer program to tilt the conduit 3 by a predetermined angle so that the feeding operation may be successively conducted in at least three stages of feeding chips 2 by a large volume, a medium volume and/or a small volume and a minute volume in order to feed the weighing vessel 4 with chips 2 efficiently and accurately.

Now, the weighing method will be described in detail. FIGS. 3 through 7 are schematic cross sectional views of the conduit 3 of a weighing apparatus using the weighing method according to the invention held to different tilted positions for feeding chips 2 by a large volume, a medium volume, a small volume and a minute volume respectively.

Figure 3:
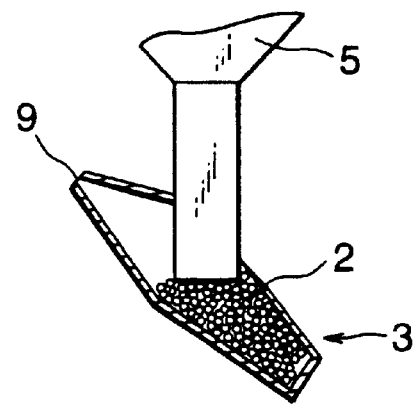
FIG. 3 is a schematic cross sectional view of a conduit of the weighing apparatus using the weighing method according to the invention, showing that the conduit is held to a tilted position before the start of a weighing operation.

FIG. 3 is a schematic cross sectional view of the conduit 3 of the weighing apparatus using the weighing method according to the invention before the start of a weighing operation and filled with chips 2 fed from the storage section 1. Note that chips 2 are fed into the conduit 3 with the discharge port 9 turned upward from the horizontal position and therefore the chips 2 in the conduit 3 are found mostly in the rear portion of the conduit 3. The supply of chips 2 is suspended when the top of the chips 2 in the conduit 3 gets to the bottom portion 5 of the storage section 1. The tilted state of the conduit 3 with the discharge port 9 slightly turned upward provides a reference position for the weighing operation of the weighing apparatus and the conduit 3 is turned back to this reference position after each stage of chip discharging operation to receive chips 2 to be in the same condition as that of before the discharging operation and get into the next stage of operation so that an accurately predetermined volume of chips 2 may always be discharged by each chip discharging motion.

Figure 4:
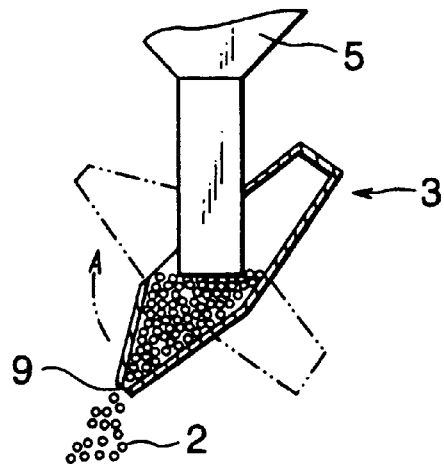
FIG. 4 is a schematic cross sectional view of the conduit same as that of FIG. 3 but held to a tilted position for letting the object of weighing fall by a large volume.

FIG. 4 is a schematic cross sectional view of the conduit 3 same as that of FIG. 3 but held to a tilted position for letting the object of weighing fall by a large volume. The conduit 3 is tilted by an inclination angle from the level position for feeding with the discharge port 9 facing downward (hereinafter referred to as the angle of inclination or feeding angle) which is the largest. If a 1,000 g of chips is to be weighed in by a single weighing cycle, the conduit 3 is typically tilted by about 30 degrees to discharge about 700 g in the first stage. When the chips 2 dumped into the weighing vessel 4 below gets to 700 g as sensed by the weighing section 13, a signal is transmitted to the central processing unit 14 to drive the motor 11 reversely and stop the discharge of chips and the conduit 3 is turned back to the reference position indicated by broken lines. And the chips 2 are fed in the conduit 3 until it reaches to the amount it had before the dumping operation, as shown in FIG. 3. Then, the operation gets into the second stage of feeding chips by a medium volume.

Figure 5:
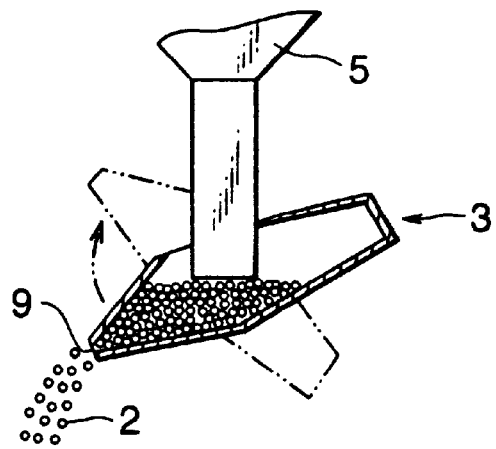
FIG. 5 is a schematic cross sectional view of the conduit same as that of FIG. 3 but held to a tilted position for letting the object of weighing fall by a medium volume.

FIG. 5 is a schematic cross sectional view of the conduit 3 same as that of FIG. 3 but held to a tilted position with the medium angle of inclination for letting the object of weighing fall by a medium volume. If the 1,000 g of chips is to be weighed in by the single weighing cycle as described above, the conduit 3 is typically tilted by about 20 degrees to discharge about 230 g in the second stage. When the chips 2 dumped into the weighing vessel 4 gets to 230 g to make the total of 930 g as sensed by the weighing section 13, a signal is transmitted to the central processing unit 14 to drive the motor 11 reversely and stop the discharge of the chips 2 and the conduit 3 is turned back again to the reference position indicated by the broken lines. And the chips 2 are fed in the conduit 3 until it reaches to the amount it had before the dumping operation, as shown in FIG. 3. Then, the operation gets into the third stage of feeding chips by a small volume.

Figure 6:
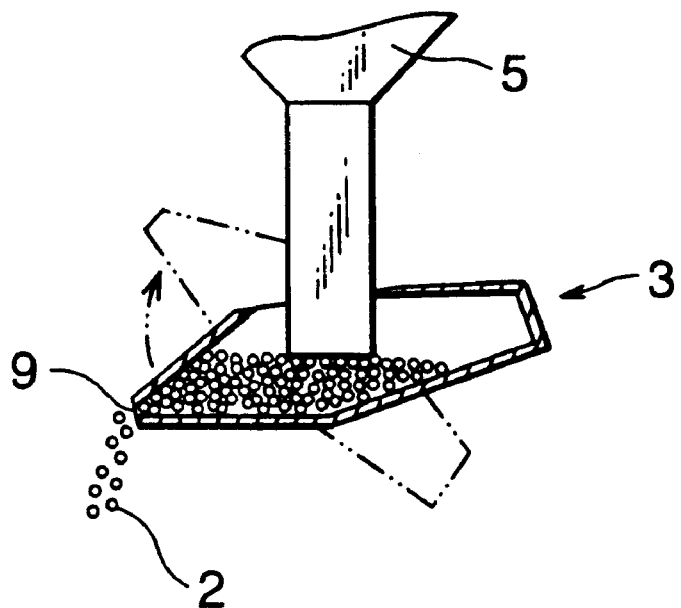
FIG. 6 is a schematic cross sectional view of the conduit same as that of FIG. 3 but held to a tilted position for letting the object of weighing fall by a small volume.

FIG. 6 is a schematic cross sectional view of the conduit 3 same as that of FIG. 3 but held to a tilted position with the small angle of inclination for letting the object of weighing fall by a small volume. If the 1,000 g of chips is to be weighed in by the single weighing cycle as described above, the conduit 3 is typically tilted by about 18 degrees to discharge about 64 g in the third stage. When the chips 2 dumped into the weighing vessel 4 gets to 64 g to make the total of 994 g as sensed by the weighing section 13, a signal is transmitted to the central processing unit 14 to drive the motor 11 reversely and stop the discharge of chips 2 and the conduit 3 is turned back again to the reference position indicated by the broken lines. And the chips 2 are fed in the conduit 3 until it reaches to the amount it had before the dumping operation, as shown in FIG. 3. Then, the operation gets into the fourth stage of feeding chips 2 by a minute volume. There may arise a situation where the predetermined volume of chips 2 has not been dumped into the weighing vessel 4 within a predetermined period of time with a small angle of inclination. If such is the case, the angle of inclination is automatically increased to let chips 2 fall by the predetermined volume.

Figure 7:
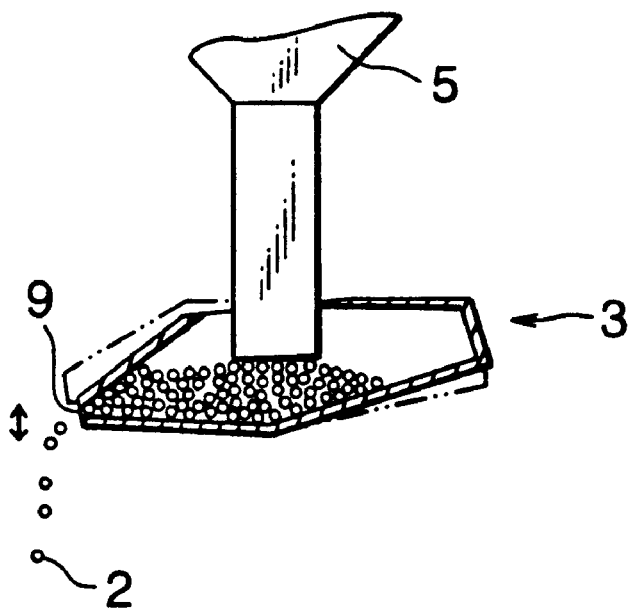
FIG. 7 is a schematic cross sectional view of the conduit same as that of FIG. 3 but held to a tilted position for letting the object of weighing fall by a minute volume.

FIG. 7 is a schematic cross sectional view of the conduit 3 same as that of FIG. 3 but held to a tilted position with the minute angle of inclination for letting the object of weighing fall by a minute volume. The discharge port 9 is made to swing vertically within an angle of 1 degree from the level position so that the chips 2 in the conduit 3 may be dumped into the weighing vessel 4. As the weighing section 13 senses that the total volume of the dumped chips gets to the target of 1,000 g, the conduit 3 is turned back the reference position with the discharge port 9 turning slightly upward so as to stop the dumping. If the chips 2 do not fall by swinging the discharge port 9 within an angle of 1 degree, the angle of inclination is increased from 1 degree to about 2 degrees so that the chips 2 in the weighing vessel 4 gets to the target volume. While chips 2 are dumped into the weighing vessel 4 in four stages of large volume, medium volume, small volume and minute volume in this embodiment by referring to FIGS. 3 through 7, the chip weighing cycle may alternatively have three stages by omitting the stage of medium volume or that of small volume depending on the target volume of chips to be dumped into the weighing vessel 4. Additionally, the angle of inclination of the conduit 3 for each stage may be modified depending on the target volume of chips to be dumped into the weighing vessel 4.

As described above, with the method of weighing the powder/chip according to the invention, the conduit 3 is tilted sequentially at least by three different feeding angles of large, medium or small and minute to let the powder/chip fall through the discharge port 9 by a large volume, a medium or small volume and a minute volume respectively. The angle of inclination can be regulated for each stage depending on the state of the conduit 3, that of the object to be discharged, ambient temperature and humidity and other factors. Thus, the target volume of the powder/chip can be accurately weighed in at the end of the final stage of feeding the powder/chip by a minute volume and fed to the weighing vessel 4. Therefore, with the method of weighing the powder/chip according to the invention, the fluctuation of time required for weighing does not occur, so that the power/chip can be fed to the weighing vessel 4 efficiently, maintaining high weighing precision.

The feeding angle of the conduit 3 is selected each time to let the powder/chip fall into the weighing vessel 4 after turning the conduit 3 back to the state where the discharge port 9 is facing upwardly of the level position. With this arrangement, the variation in the discharged volume in a preceding stage does not affect the volume to be discharged in a succeeding stage so that the operation of weighing the powder/chip can be conducted further efficiently and accurately.

The feeding angle of the conduit 3 at the final stage is between 1 and 2 degrees from the level position and the discharge port 9 at an end of the conduit 3 is pivoted back and forth between the feeding angle and the level position to let the powder/chip fall into the weighing vessel 4. With this arrangement, the powder/chip can be discharged one by one so that the weighing precision further improves.

What is claimed is:

1. A method of weighing powder/chip by means of a conduit arranged below a storage section and adapted to be tilted around a pivot according to a command sent from a weighing section to let the powder/chip fall through a discharge port at an end of the conduit into a weighing vessel placed on the weighing section, wherein said conduit is tilted sequentially at least by three different feeding angles from large angle, small angle to minute angle to let the powder/chip fall by a large volume, a small volume and a minute volume respectively.

2. A method of weighing powder/chip according to claim 1, wherein the feeding angle of the conduit is set each time to let the powder/chip fall into the weighing vessel after turning the conduit back to the state where the discharge port is facing slightly upwardly of the horizontal state.

3. A method of weighing powder/chip according to claim 1 or 2, wherein the feeding angle of the conduit at the final stage is between 1 and 2 degrees from the level position and the discharge port at an end of the conduit is pivoted back and forth between the feeding angle and the level position to let the powder/chip fall into the weighing vessel.

* * * * *